United States Patent [19]

Hasegawa

[11] 4,298,263
[45] Nov. 3, 1981

[54] ELECTROMAGNETIC RELEASE DEVICE IN A CAMERA

[75] Inventor: Hiroshi Hasegawa, Tokyo, Japan

[73] Assignee: Nippon Kogaku K.K., Tokyo, Japan

[21] Appl. No.: 104,841

[22] Filed: Dec. 18, 1979

[30] Foreign Application Priority Data

Dec. 28, 1978 [JP] Japan ................ 53-178535[U]

[51] Int. Cl.$^3$ .............................................. G03B 9/08
[52] U.S. Cl. ................................................ 354/234
[58] Field of Search ............... 354/234, 235, 266, 258, 354/50, 51, 60 R; 361/156

[56] References Cited

U.S. PATENT DOCUMENTS 3,487,759  1/1970  Fahlenberg ................ 354/234 X

FOREIGN PATENT DOCUMENTS 995790  6/1965  United Kingdom ............... 354/234

Primary Examiner—L. T. Hix
Assistant Examiner—William B. Perkey
Attorney, Agent, or Firm—Fitzpatrick, Cella, Harper & Scinto

[57] ABSTRACT

An electromagnetic release device in a camera having a power source for charging a capacitor, and an electromagnet for release connected between the terminals of the capacitor includes switch means for selectively connecting the capacitor to the power source or the electromagnet. The switch means is adapted to connect the capacitor to the electromagnet in response to shutter release operation to thereby form a discharging circuit for the capacitor and adapted, during the other time, to connect the capacitor to the power source to thereby form a charging circuit for the capacitor.

3 Claims, 21 Drawing Figures

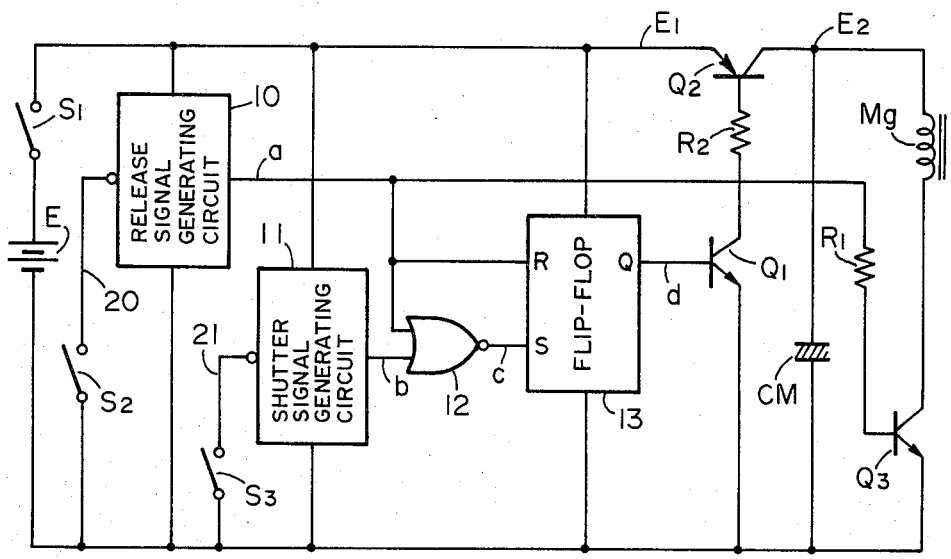
FIG. 1
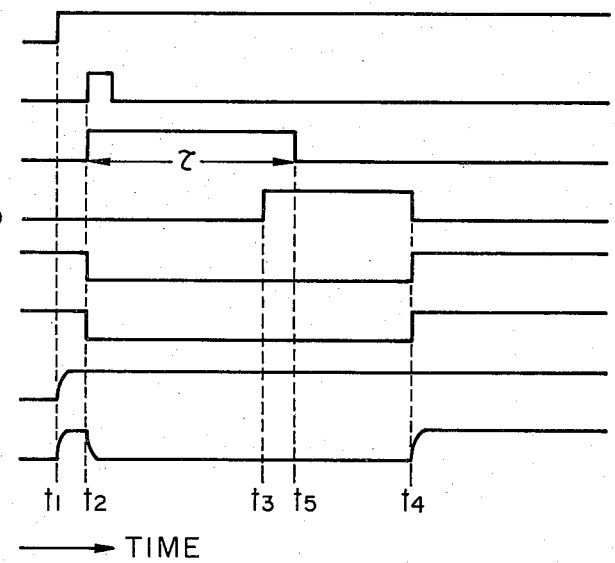

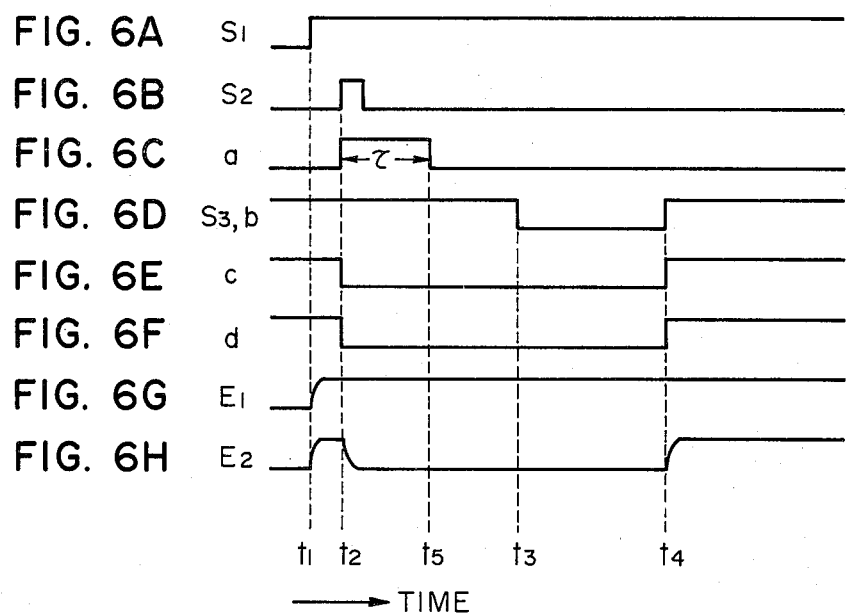
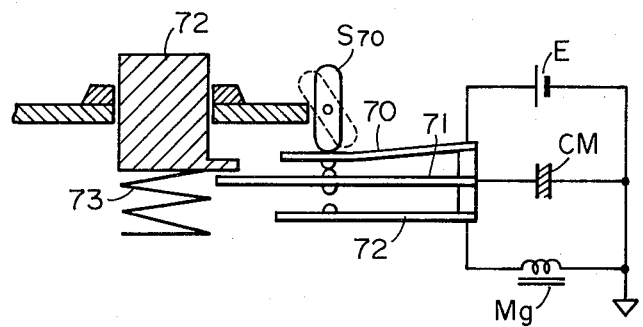
FIG. 7

ELECTROMAGNETIC RELEASE DEVICE IN A CAMERA

BACKGROUND OF THE INVENTION

1. Field of the Invention

This invention relates to an electromagnetic release device in a camera.

2. Description of the Prior Art

An electromagnetic release device in which a charging circuit comprising a serial connection of a power source, a resistor and a capacitor is formed and a series circuit comprising a switch element and an electromagnet for shutter release is parallel-connected to the capacitor to form a discharging circuit is known, for example, from Japanese Laid-open Patent Application No. 19526/1977.

This circuit can prevent abnormal operation of an exposure control circuit caused by a drop of the source voltage during the power supply to the electromagnet resulting from releasing operation, but has suffered from a disadvantage that it hastens the deterioration of the capacitor used in the charging-discharging circuit. This is because the capacitor has a property that the deterioration of the characteristic thereof is hastened if charging and discharging are effected simultaneously.

SUMMARY OF THE INVENTION

It is an object of the present invention to provide an electromagnetic release device in a camera in which the hastening of the deterioration of the capacitor in the charging-discharging circuit is avoided.

The invention will become fully apparent from the following detailed description thereof taken in conjunction with the accompanying drawings.

BRIEF DESCRIPTION OF THE DRAWINGS

FIG. 1 shows a first embodiment of the electromagnetic release device in a camera according to the present invention.

FIGS. 2A-2H are time charts showing waveforms of various portions of FIG. 1 to illustrate the operation of the device of FIG. 1.

FIGS. 6A-6H are time charts similar to FIGS. 2A-2H where the block 11 in FIG. 1 is replaced by the block 110 of FIG. 5.

FIG. 7 shows another embodiment.

DESCRIPTION OF THE PREFERRED EMBODIMENTS

Figure 3:
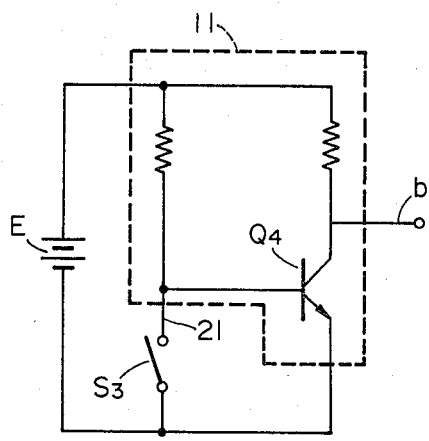
FIG. 3 is a circuit diagram showing an example of the block 11 of FIG. 1.

FIG. 1 shows the electromagnetic release device according to an embodiment of the present invention. A power source E, a main switch $S_1$, a transistor $Q_2$ and a capacitor $C_M$ are connected in series to thereby form a charging circuit for the capacitor $C_M$. On the other hand, a series circuit comprising an electromagnetic Mg for shutter release and a transistor $Q_3$ is connected between the terminals of the capacitor $C_M$ to thereby form a discharging circuit for the capacitor $C_M$. A release signal generating circuit 10 comprises, for example, a one-shot multivibrator, and connected to the input terminal 20 thereof is a release switch $S_2$ adapted to be closed by depression of the shutter release button of a camera. The output terminal a of the release signal generating circuit 10 is connected to the base of the transistor $Q_3$ through a resistor $R_1$. The output of the release signal generating circuit 10 is designed so as to assume a high level for a predetermined time $\tau$ after the release switch $S_2$ has been closed. This predetermined time $\tau$ is set to a value greater than exposure time. A shutter signal generating circuit 11 is a gate circuit as shown in FIG. 3, which produces a high level signal at the output terminal b thereof when the input terminal 21 thereof is at a low level and generates a low level signal at the output terminal b when the input terminal 21 is at a high level. A shutter switch $S_3$ is a switch for setting the input terminal 21 of the shutter signal generating circuit 11 to a low level or a high level. The shutter switch $S_3$ is adapted to be closed upon termination of exposure and to be opened by manual operation. The shutter switch $S_3$ may be designed such that the closing thereof takes place upon start (or termination) of the movement of the rearward shutter curtain as is used in a motor drive mechanism and that the opening thereof takes place in response to a film advance mechanism. The output line a of the release signal generating circuit 10 is connected to one input terminal of a two-input NOR gate 12 and the output line b of the shutter signal generating circuit 11 is connected to the other input terminal of the NOR gate 12. The output terminal c of the two-input NOR gate 12 is connected to the set input S of an S-R flip-flop 13 and the output terminal a of the release signal generating circuit 10 is connected to the reset input R of the S-R flip-flop 13. A transistor $Q_1$ has its collector connected to the base of the transistor $Q_2$ through a resistor $R_2$, its emitter connected to the negative pole of the power source E, and its base connected to the Q output of the S-R flip-flop 13 by a line d.

The operation of the FIG. 1 circuit will now be described by reference to FIGS. 2A-2H which are time charts showing the waveforms at various portions of the circuit shown in FIG. 1.

In the condition of FIG. 1, the main switch $S_1$ is actuated at time $t_1$. At this time, the various portions in the circuit are in their initial condition and the output line a of the release signal generating circuit 10 is at a low level and accordingly, the transistor $Q_3$ is in OFF-state and the output line b of the shutter signal generating circuit 11 is at a low level. Since the two inputs of the NOR gate 12 are both at a low level, the output line c thereof assumes a high level and the S-R flip-flop 13 is set and the line d connected to the Q output thereof assumes a high level. Accordingly, the transistors $Q_1$ and $Q_2$ conduct and the capacitor $C_M$ is charged by the power source E. The emitter voltage $E_1$ and collector voltage $E_2$ of the transistor $Q_2$ at this time are as shown in FIGS. 2G and 2H respectively. This charging circuit is designed such that the time constant thereof is short and therefore, the capacitor $C_M$ is charged in a moment.

Next, when a shutter button is depressed at time $t_2$ to start photography, the switch S2 is closed, so that the release signal generating circuit 10 produces high level pulse on the line a for the predetermined time $\tau$. Since the transistor $Q_3$ conducts for the period $\tau$, the current provided by the charge stored in the capacitor $C_M$ flows through the electromagnet Mg for shutter release, so that the electromagnet Mg is energized to move a forward shutter curtain, not shown. On the hand, when the output line a of the circuit 10 assumes a high level, the output line c of the NOR gate 12 assumes a low level and the S-R flip-flop 13 is reset. By this, the transistors $Q_1$ and $Q_2$ are turned off to open the charging circuit for the capacitor $C_M$.

When the exposure for a predetermined time is completed, the switch $S_3$ is closed at time $t_3$ and the input line 21 of the shutter signal generating circuit 11 assumes a low level, so that the output line b thereof assumes a high level. Accordingly, the output line c of the NOR gate 12 maintains a low level and the S-R flip-flop 13 remains reset. Since the transistors $Q_1$ and $Q_2$ are maintaining their non-conductive state, the charging of the capacitor $C_M$ does not yet take place at this time. The transistor $Q_3$ restores its non-conductive state at time $t_5$ when the output line a of the one-shot circuit 10 assumes a low level.

When the film is advanced at time $t_4$, the shutter switch $S_3$ is opened, so that the output line b of the circuit 11 assumes a low level. Since both the two inputs of the two-input NOR gate 12 are then at a low level, the output line c thereof assumes a high level and the Q output of the S-R flip-flop 13 is changed to a high level. Accordingly, the transistors $Q_1$ and $Q_2$ conduct to permit the capacitor $C_M$ to be charged by the power source E. In this manner, the circuit becomes ready for the next exposure operation.

Figure 4:
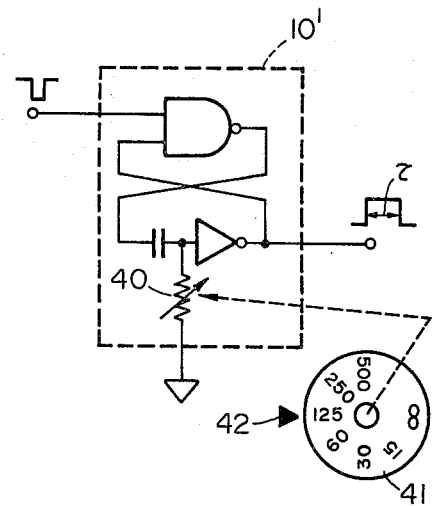
FIG. 4 is a circuit diagram showing another embodiment of the block 10.
Figure 5:
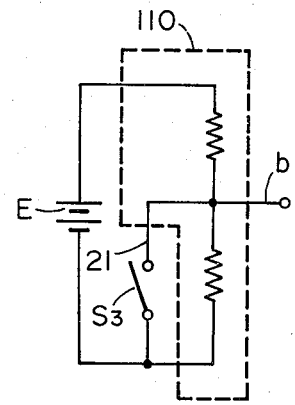
FIG. 5 is a circuit diagram showing another embodiment of the block 11 of FIG. 1.

The aforementioned time $\tau$ when the output of the release signal generating circuit 10 assumes a high level may be varied by associating the value of a resistor 40 or the like with a shutter dial 41 or the like so that the value of the resistor 40 or the like is varied in accordance with the shutter speed in a case where the one-shot multivibrator 10' as shown in FIG. 4 is used as the circuit 10.

Where it is desired that the time $\tau$ during which the output of the release signal generating circuit 10 assumes a high level be set to a short time, the shutter signal generating circuit 11 may be changed into a circuit such as the block 110 of FIG. 5. That is, in the block 110 of FIG. 5, a high level is generated on the output line b when the switch $S_3$ is opened and a low level is generated on the output line b when the switch $S_3$ is closed. Accordingly, the time chart of the circuit in which the block 11 of FIG. 1 is replaced by the block 110 of FIG. 5 becomes as shown in FIG. 6. As is apparent from the time charts of FIGS. 6A–6H, the transistor $Q_2$ is turned on for the time from $t_1$ to $t_2$ and for the time succeeding to $t_4$, and the transistor $Q_3$ is turned on for the time from $t_2$ to $t_5$.

It is apparent that the time charts of FIGS. 2A–2H and 6A–6H can be variously modified and at a point of time whereat the time $\tau$ has elapsed, the output line d may be rendered to a high level to turn on the transistor $Q_2$ and also, the time $\tau$ may be prolonged to the time $t_4$.

In the foregoing, the control system has been described as being constructed in an electric circuit, whereas the control system may be mechanically constructed as shown in FIG. 7. In FIG. 7, when a main switch $S_{70}$ is closed as shown, contact pieces 70 and 71 contact each other to complete the charging circuit for the capacitor $C_M$. Next, when a release button 72 is depressed against the force of a spring 73, the contact pieces 70 and 71 are separated from each other and the contact piece 71 contacts a contact piece 72. Thereupon, the discharging circuit for the capacitor $C_M$ is completed and the charge stored in the capacitor $C_M$ is discharged through the electromagnet Mg and thus, release is effected.

With the above-described construction, the magnetic release device according to the present invention selectively and not simultaneously effects the charging and discharging of the capacitor and thus, can prevent the deterioration of the capacitor characteristic from being hastened.

I claim:

1. An electromagnetic device for effecting exposure in a camera in response to a shutter release operation, comprising:
   a shutter release device, a capacitor, a power source for charging said capacitor, and an electromagnet connected between the terminals of said capacitor for controlling said shutter release device,
   switch means for selectively connecting said capacitor to said power source or said electromagnet, said switch means connecting said capacitor to said electromagnet in response to shutter release operation to thereby form a discharging circuit for said capacitor for a period of time other than the time needed for forming a capacitor charging circuit, or connecting said capacitor to said power source to thereby form the charging circuit for said capacitor, said switch means including:
   a first switch element connected between said power source and said capacitor;
   a second switch element connected between said electromagnet and said capacitor; and
   a control circuit for controlling said first and second switch elements so that only said second switch element is closed in response to shutter release operation and said second switch element is opened after the time needed for keeping the second switch element closed and that said first switch element is closed only for a fixed time other than the time needed for keeping the second switch element closed.

2. The electromagnetic release device according to claim 1, wherein the control circuit includes:
   a first mechanical switch which is closed in response to the shutter release operation,
   a pulse generating circuit which produces a pulse signal having a constant time width by the ON operation of the first mechanical switch,
   a second mechanical switch which is disposed in a first condition upon the completion of exposure and in a second condition by manual operation,
   a signal generating circuit which produces a digital signal having different conditions depending on the second mechanical switch occupying said first or second conditions, and means connected to said pulse generating circuit and said signal generating circuit, producing a first signal when the pulse signal is produced, and generating a second signal by detecting from the change of condition of the digital signal that the second mechanical switch is disposed in the second condition,
   the first switch element being connected to the producing means and being closed by the second signal and opened by the second signal,
   the first switch element being connected to the pulse generating circuit and being maintained closed while the pulse signal is being produced.

3. The electromagnetic release device according to claim 2, wherein:
   the pulse generating circuit is one-shot multivibrator whose pulse width is determined by the time constant set by a capacitor and a resistor, the resistor value being variable according to exposure time.

* * * * *

UNITED STATES PATENT AND TRADEMARK OFFICE
CERTIFICATE OF CORRECTION

PATENT NO. : 4,298,263
DATED : November 3, 1981
INVENTOR(S) : HIROSHI HASEGAWA

It is certified that error appears in the above—identified patent and that said Letters Patent is hereby corrected as shown below:

Column 2, line 67, after "the" (first occurrence), insert --other--.

Column 4, line 58, "second" should be --first--; line 59, "first" should be --second--.

Signed and Sealed this

Nineteenth Day of January 1982

[SEAL]

Attest:

GERALD J. MOSSINGHOFF

Attesting Officer   Commissioner of Patents and Trademarks